United States Patent
Ma et al.

(10) Patent No.: US 12,334,035 B2
(45) Date of Patent: Jun. 17, 2025

(54) IMAGE DISPLAY METHOD AND APPARATUS, AND MEDIUM

(71) Applicant: BEIJING BAIDU NETCOM SCIENCE TECHNOLOGY CO., LTD., Beijing (CN)

(72) Inventors: Weixiang Ma, Beijing (CN); Jian Huang, Beijing (CN); Quanbin Li, Beijing (CN); Guangkui Cai, Beijing (CN); Jiao Chen, Beijing (CN); Liqun Zhou, Beijing (CN); Shunhui Tang, Beijing (CN); Weisong Cui, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 448 days.

(21) Appl. No.: 17/807,684

(22) Filed: Jun. 17, 2022

(65) Prior Publication Data
US 2023/0052979 A1    Feb. 16, 2023

(30) Foreign Application Priority Data
Aug. 10, 2021    (CN) .......................... 202110913873.1

(51) Int. Cl.
*G09G 5/00*    (2006.01)

(52) U.S. Cl.
CPC ..... *G09G 5/005* (2013.01); *G09G 2340/0407* (2013.01); *G09G 2360/18* (2013.01)

(58) Field of Classification Search
None
See application file for complete search history.

(56) References Cited

U.S. PATENT DOCUMENTS

| 8,766,993 B1* | 7/2014 | Hobbs ....................... G06F 3/14 345/538 |
| 2014/0281008 A1* | 9/2014 | Muthiah ................. H04L 67/01 709/231 |

FOREIGN PATENT DOCUMENTS

| CN | 109284151 A | 1/2019 |
| CN | 110413245 A | 11/2019 |

(Continued)

OTHER PUBLICATIONS

First Chinese Office Action, The State Intellectual Property Office of People's Republic of China, issued to CN Application No. 202120913873.1 on Apr. 24, 2022, 11 pages.

(Continued)

*Primary Examiner* — Yanna Wu
(74) *Attorney, Agent, or Firm* — Hunton Andrews Kurth LLP (57) ABSTRACT

Provided are an image display method and apparatus, an electronic device, and a medium, which relate to the field of computer technologies, in particular to the fields of cloud phones, cloud computing and cloud services. The specific implementation scheme is as follows: generating a simulated external display of a cloud device according to an acquired target resolution of a target client; and generating frame buffer data according to a frame buffer area of the simulated external display in the cloud device, and sending the frame buffer data to the target client so that the target client performs image display on a target interface according to the frame buffer data.

15 Claims, 4 Drawing Sheets

(56) References Cited

FOREIGN PATENT DOCUMENTS

| | | |
|---|---|---|
| CN | 111796885 A | 10/2020 |
| CN | 113015021 A | 6/2021 |

OTHER PUBLICATIONS

First Chinese Search Report, from the State Intellectual Property Office of People's Republic of China, issued to CN Application 202120913873.1, on Apr. 15, 2022, 1 page.
Extended European Search Report issued in EP 22176656.1 dated Nov. 21, 2022, 9 pages.

* cited by examiner

IMAGE DISPLAY METHOD AND APPARATUS, AND MEDIUM

CROSS-REFERENCE TO RELATED APPLICATION

This disclosure claims the priority to Chinese Patent Application No. CN 202110913873.1, filed on Aug. 10, 2021, the disclosure of which is incorporated herein by reference in its entirety.

TECHNICAL FIELD

The present disclosure relates to the field of computer technologies, in particular to the fields of cloud phones, cloud computing and cloud services, and for example to an image display method and apparatus, an electronic device, and a medium.

BACKGROUND

Cloud phone refers to mobile phones through which users use the client locally to remotely operate the cloud, so as to achieve the separation of display, rendering and computing. Due to the different resolutions of mobile phone clients, the resolution of cloud rendering is different from the resolution of the client, which affects the user experience.

At present, the resolution adaptation scheme of cloud phone is to regenerate a cloud phone according to the resolution of the client so as to adapt to the resolution of the client.

SUMMARY

The present disclosure provides an image display method and apparatus, and a medium, which are used for controlling a cloud device to adapt to a client resolution.

According to an aspect of the present disclosure, an image display method is provided. The method includes the steps described below.

A simulated external display of a cloud device is generated according to an acquired target resolution of a target client.

Frame buffer data is generated according to a frame buffer area of the simulated external display in the cloud device, and the frame buffer data is sent to the target client so that the target client performs image display on a target interface according to the frame buffer data.

According to another aspect of the present disclosure, an image display apparatus is provided. The apparatus includes at least one processor; and a memory communicatively connected to the at least one processor; wherein the memory stores instructions executable by the at least one processor, and the instructions are executed by the at least one processor to cause the at least one processor to perform steps in the following modules: a display generation module and a frame buffer data generation module.

The display generation module is configured to generate a simulated external display of a cloud device according to an acquired target resolution of a target client.

The frame buffer data generation module is configured to generate frame buffer data according to a frame buffer area of the simulated external display in the cloud device, and send the frame buffer data to the target client so that the target client performs image display in a target interface according to the frame buffer data.

According to another aspect of the present disclosure, a non-transitory computer-readable storage medium is provided. The storage medium stores computer instructions for causing a computer to perform any method in the present disclosure.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure. In the drawings.

DETAILED DESCRIPTION

Example embodiments of the present disclosure, including details of the embodiments of the present disclosure, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

The applicant found during the research and development that with the development of smart terminals, there are smart terminals with various display ratios on the market, such as the common smart phones with a display ratio of 16:9 or 5:3, and with the rapid development of flexible display technology, there are even smart phones with a display ratio of 1:1. The above situation easily leads to the difference between the default image rendering ratio of cloud devices and the display ratio of smart terminals, which causes the problem that images do not fit when users use cloud devices through smart terminals. The problem is mainly reflected in the following two aspects.

1) In a smart terminal, the image is displayed directly according to the image rendering ratio of a cloud device.

Figure 1A:
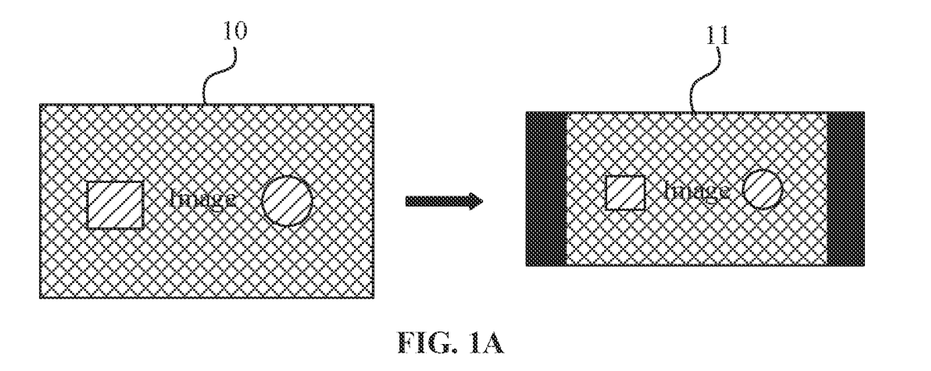
FIG. 1A is a schematic diagram of display black borders according to an embodiment of the present disclosure.

However, since the display ratio of the smart terminal is different from the image rendering ratio of the cloud device, the smart terminal needs to crop the image to fit the display ratio of the smart terminal, which leads to the presence of black borders in the display of the smart terminal. FIG. 1A is a schematic diagram of display black borders according to an embodiment of the present disclosure. As shown in FIG. 1A, 10 is an image rendered in a cloud device, and 11 is an interface displaying the image 10 directly according to the image rendering ratio of the cloud device in a smart terminal. As can be seen, black borders exist on the left and right sides of the interface 11, which affects the user experience.

2) The rendered image of the cloud device is forcibly stretched in the smart terminal to adapt to the display ratio of the smart terminal.

Figure 1B:
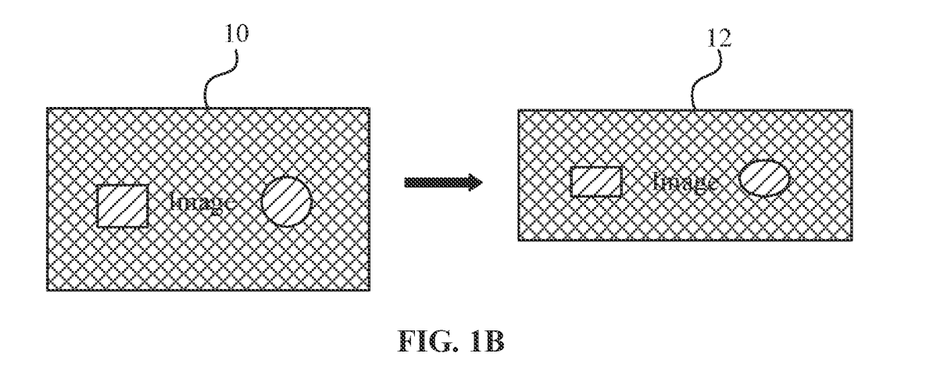
FIG. 1B is a schematic diagram of a display shape distortion according to an embodiment of the present disclosure.

However, the forcible stretching will lead to the shape distortion of the rendered image of the cloud device when displayed, which affects the authenticity of the image. FIG. 1B is a schematic diagram of a display shape distortion according to an embodiment of the present disclosure. As shown in FIG. 1B, 10 is an image rendered in a cloud device, and 12 is an interface displaying the image 10 that is forcibly stretched in a smart terminal. As can be seen, a figure originally displayed as a square in the image 10 is displayed as a rectangle on the interface 12, and a figure originally displayed as a circle in the image 10 is displayed as a rectangular oval on the interface 12, which affects the user experience.

In view of the problems in the above two aspects, in the related art, the solution is mainly to regenerate a cloud device to adapt to the resolution of the smart terminal, that is, to restart the cloud device. The reason why the cloud device needs to be restarted is that after the generation of the cloud device is completed, the frame buffer area used for image rendering in the cloud device has been fixed and cannot be changed, and the frame buffer area can be changed to adapt to the resolution only after the cloud device is restarted. However, the restart of the cloud devices will lead to long waiting time for users to use the cloud device, affecting the user experience and wasting computing resources.

Figure 1C:
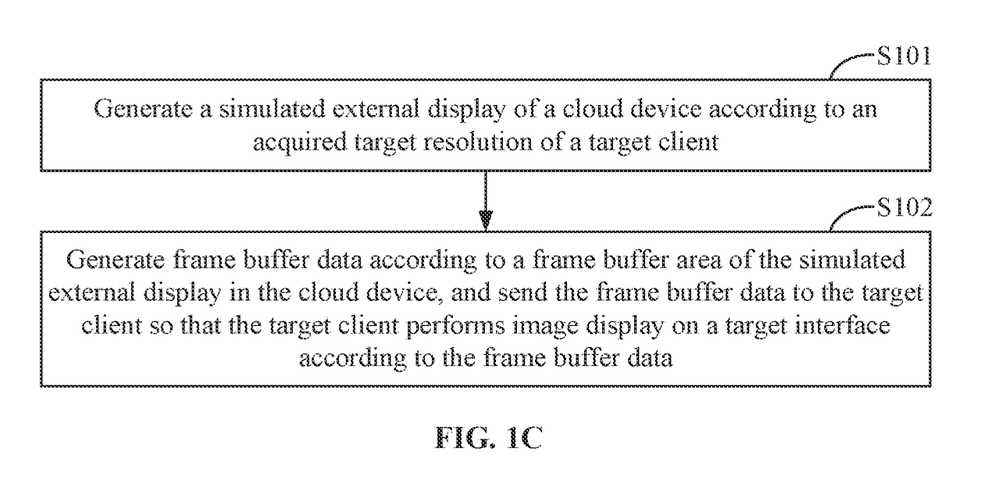
FIG. 1C is a flowchart of an image display method according to an embodiment of the present disclosure.

FIG. 1C is a flowchart of an image display method according to an embodiment of the present disclosure. This embodiment is applicable to the case where a client displays an image according to frame buffer data sent by a cloud device. The method provided by this embodiment may be performed by an image display apparatus according to an embodiment of the present disclosure. The apparatus may be implemented by software and/or hardware and integrated in any electronic device having a computing capability.

As shown in FIG. 1C, the image display method provided by this embodiment may include the steps described below.

In S101, a simulated external display of a cloud device is generated according to an acquired target resolution of a target client.

The target client is a terminal device having a display function, such as a smart phone, a smart watch, a tablet computer, a personal computer or any terminal device having a display function. The target resolution is the number of pixels that the display screen of the target client can display. For example, if the target resolution is 1920×1080 (1080P), it means that the display screen of the target client can display 1920 pixels horizontally and 1080 pixels vertically. The cloud device is a device that can achieve cloud services through a cloud server by applying the cloud computing technology to network terminal services, and such a device can achieve various functions through the network by means of its own system and network terminals set up by manufacturers. For example, users can play games, handle official business or watch videos on the client based on the powerful performance of the cloud device, thereby getting rid of the shackles of the performance of the client itself. In this embodiment, the cloud device may be a cloud phone or a cloud computer, and the specific form of the cloud device is not limited herein. The simulated external display is a simulated virtual external display that has a connection relationship with a cloud device.

In an embodiment, the user clicks an application icon corresponding to the cloud device in the target client to start the cloud device in the target client. The target client responds to the click instruction of the user, generates a start request of the cloud device, and attaches the target resolution of the target client itself to the start request, where the target resolution may be in the form of the number of pixels, for example, 1920×1080, or in the form of a converted display rate, for example, a display ratio of 16:9 converted from 1920×1080. The target client then transmits the start request to a server through the wireless network.

After the server receives the start request sent by the target client, the server parses the start request, acquires the target resolution, and sends the target resolution to the cloud device, where the cloud device is equipped with an operating system, such as android or Ubuntu. This embodiment uses an android cloud device as an example for explanation, but the operating system of the cloud device is not limited herein. Those skilled in the art can make corresponding substitutions for related components under the conception of this embodiment to achieve the same technical effect.

The kernel of the cloud device sends the target resolution to the hardware abstraction layer (HAL) of the cloud device. The HAL layer simulates a signal inserted by an external display according to the target resolution and sends the signal to the SurfaceFlinger layer and the Framework layer of the cloud device. The display manager service (DisplayManagerService) in the SurfaceFlinger layer and the Framework layer generates a display device according to the target resolution, thereby completing the generation of the simulated external display of the cloud device.

According to the acquired target resolution of the target client, the simulated external display of the cloud device is generated, achieving the effect of generating the simulated external display adapted to the target resolution and laying a foundation for generating frame buffer data based on the simulated external display.

In S102, frame buffer data is generated according to a frame buffer area of the simulated external display in the cloud device, and the frame buffer data is sent to the target client so that the target client performs image display on a target interface according to the frame buffer data.

The frame buffer area, that is, Framebuffer, is a storage space corresponding to the display area in the Android system. The content of the display screen may be changed by changing the content of the storage space. Any pixel on the display screen corresponds to a memory unit in the frame buffer area, that is, there is a mapping relationship between the pixels and the memory units in the frame buffer area. Transparency information and RGB information of pixels are written in each memory unit of the frame buffer area. The frame buffer data is image data rendered in the frame buffer area.

In an embodiment, when the simulated external display of the cloud device is generated, the gralloc module of the cloud device creates a frame buffer area corresponding to the simulated external display according to the target resolution. When the frame buffer area is created, the application programs associated with the target interface in the cloud device draw an image in the frame buffer area, that is, each application program writes the corresponding images to be rendered into the frame buffer area, and then all the images to be rendered are synthesized to obtain frame buffer data adapted to the target resolution. The cloud device sends the frame buffer data to the server, and the server transmits the received frame buffer data to the target client through the wireless network. After the target client receives the frame buffer data, the target client writes the frame buffer data into its own frame buffer area, calls a graphics processing unit (GPU) to read the frame buffer data written in its own frame buffer area, and then displays the image on the target interface.

In the present disclosure, a simulated external display of a cloud device is generated according to an acquired target resolution of a target client, frame buffer data is generated according to a frame buffer area of the simulated external display in the cloud device, and the frame buffer data is sent to the target client so that the target client performs image display on a target interface according to the frame buffer data. Since the simulated external display of the cloud device is generated according to the target resolution, the frame buffer data can be generated based on the frame buffer area of the simulated external display in the cloud device, so that the frame buffer data adapted to the target resolution can be generated without restarting the cloud device, thereby reducing the waiting time of users, improving the use experience of users and avoiding the waste of computing resources.

Figure 2A:
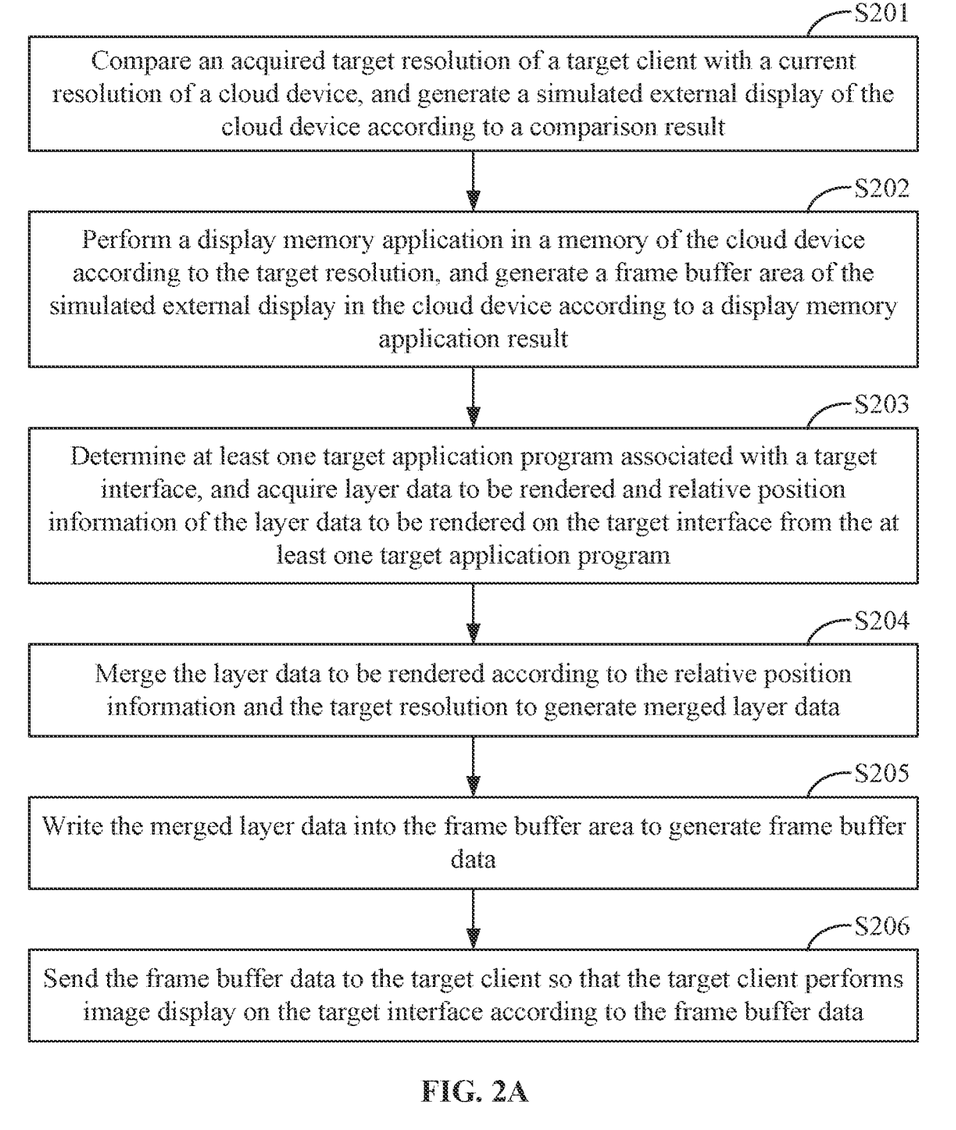
FIG. 2A is a flowchart of an image display method according to an embodiment of the present disclosure.

FIG. 2A is a flowchart of an image display method according to an embodiment of the present disclosure. This embodiment is extended based on the preceding technical solution and may be combined with the preceding various optional embodiments.

As shown in FIG. 2A, the image display method provided by this embodiment may include the steps described below.

In S201, an acquired target resolution of a target client is compared with a current resolution of a cloud device, and a simulated external display of the cloud device is generated according to a comparison result.

In an embodiment, after receiving the target resolution sent by the server, the kernel of the cloud device compares the target resolution with the default current resolution of the cloud device. In a case where the target resolution is the same as the current resolution, the frame buffer data is directly generated according to the frame buffer area of the cloud device itself, and in a case where the target resolution is not the same as the current resolution, the simulated external display of the cloud device is generated.

Optionally, S201 includes the steps described below.

In a case where the target resolution is different from the current resolution of the cloud device, a simulated signal inserted by a multimedia interface is generated, and the simulated external display is generated according to the simulated signal and the target resolution.

In an embodiment, when the kernel of the cloud device determines that the target resolution is different from the current resolution, the kernel of the cloud device sends a notification of the difference in resolution to the HAL layer of the cloud device. The HAL layer simulates a hardware composer (HWC) module and generates a simulated signal inserted by a high-definition multimedia interface (HDMI) according to the HWC module, that is, the HWC simulates multimedia interface signal insertion. Then the HAL layer sends the simulated signal to the SurfaceFlinger layer and the Framework layer of the cloud device so that the SurfaceFlinger layer and the Framework layer generate a display device according to the simulated signal and the target resolution, thereby completing the generation of the simulated external display of the cloud device.

In a case where the target resolution is different from the current resolution of the cloud device, a simulated signal inserted by a multimedia interface is generated, and the simulated external display is generated according to the simulated signal and the target resolution, thereby laying a foundation for subsequently obtaining a frame buffer area adapted to the target resolution based on the simulated external display with the permission.

In S202, a display memory application is performed in a memory of the cloud device according to the target resolution, and a frame buffer area of the simulated external display in the cloud device is generated according to a display memory application result.

In an embodiment, the SurfaceFlinger layer of the cloud device performs a display memory application for the simulated external display in the memory of the cloud device according to the target resolution through the gralloc module of the cloud device, thereby taking a certain target memory space in the memory as a frame buffer area of the simulated external display, that is, the frame buffer is adapted to the target resolution.

In S203, at least one target application program associated with a target interface is determined, and layer data to be rendered and relative position information of the layer data to be rendered on the target interface are acquired from the at least one target application program.

The target application program represents an application program having layer data to be rendered on the target interface. For example, when the target interface is a desktop interface, the layer data to be rendered included on the desktop interface may be a status bar, a navigation bar, a wallpaper and an application icon, where the status bar and the navigation bar are rendered by a system UI application program, the wallpaper is rendered by a wallpaper application program, and the application icon is rendered by the Launcher application program, and then the system UI application program, the wallpaper application program and the Launcher application program are taken as the target application program of the desktop interface.

In an embodiment, according to the association relationship between the target interface and the preset interface and candidate application programs, the target application associated with the target interface is determined from the candidate application programs, and the HWC module of the cloud device acquires from the target application program the layer data to be rendered and the relative position information of the layer data set by the target application program in the target interface, where the relative position information includes, but is not limited to, relative coordinate positions of layer data pixels in the target interface.

In S204, the layer data to be rendered is merged according to the relative position information and the target resolution to generate merged layer data.

In an embodiment, according to the target resolution and the relative position information, the position of the layer data at the target resolution is determined, and then the layer data is merged to generate merged layer data.

Optionally, S204 includes the steps described below.

Absolute position information of the layer data to be rendered in the target interface is determined according to the relative position information and the target resolution, and the layer data to be rendered is merged according to the absolute position information to generate the merged layer data.

In an embodiment, the HWC module of the cloud device determines the absolute position information of the layer data pixels in the target interface according to the target resolution and the relative coordinate positions of layer data pixels in the target interface. For example, when the target resolution is 1920×1080, the absolute coordinate positions of 1920 pixels in the horizontal direction and 1080 pixels in the vertical direction among the layer data pixels are determined according to the relative coordinate positions. Then the layer data is merged according to the absolute position information of the layer data to obtain the merged layer data.

The absolute position information of the layer data in the target interface is determined according to the relative position information and the target resolution, and the layer data is merged according to the absolute position information to generate the merged layer data, thereby achieving the effect of adaptively synthesizing layer data based on the target resolution, ensuring that the merged layer data can be adaptively displayed on the target interface and ensuring the user experience.

In S205, the merged layer data is written into the frame buffer area to generate frame buffer data.

In an embodiment, the SurfaceFlinger layer of the cloud device renders the merged layer data generated by the HWC module in the frame buffer area, that is, the merged layer data is written into the memory space of the frame buffer area in a predetermined format.

In S206, the frame buffer data is sent to the target client so that the target client performs image display on the target interface according to the frame buffer data.

In the present disclosure, the target resolution is compared with a current resolution of the cloud device, and the simulated external display of the cloud device is generated according to a comparison result, thereby laying a foundation for subsequently generating frame buffer data based on the simulated external display, avoiding the generation of meaningless simulated external displays, and reducing the waste of resources; a display memory application is performed in a memory of the cloud device according to the target resolution, and the frame buffer area is generated according to a display memory application result, thereby achieving the effect of generating a frame buffer area adopted to the target resolution and ensuring the subsequent adaptive display of the image on the target interface of the target client; at least one target application program associated with the target interface is determined, layer data to be rendered and relative position information of the layer data on the target interface are acquired from the at least one target application program, the layer data is merged according to the relative position information and the target resolution to generate merged layer data, and the merged layer data is written into the frame buffer area to generate frame buffer data, thereby achieving the effect of adaptively merging layer data based on the target resolution, ensuring the adaptive display of the merged layer data on the target interface, and ensuring the user experience.

Figure 2B:
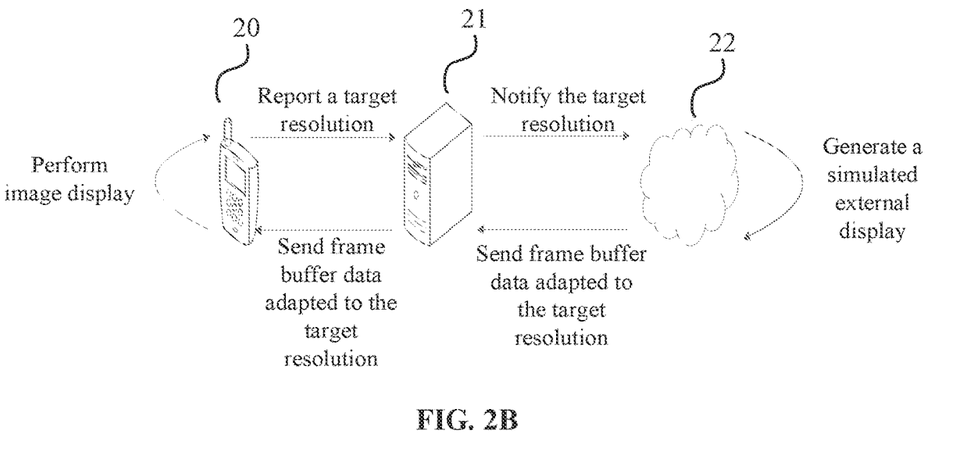
FIG. 2B is a schematic diagram of a device interaction of an image display method according to an embodiment of the present disclosure.

FIG. 2B is a schematic diagram of a device interaction of an image display method according to an embodiment of the present disclosure. As shown in FIG. 2B, the client 20 reports the target resolution of the client 20 to the server 21, the server 21 notifies the cloud device 22 of the target resolution, the cloud device 22 generates a simulated external display of the cloud device 22 according to the target resolution, generates frame buffer data adapted to the target resolution in the frame buffer area of the cloud device 22 according to the simulated external display and sends the frame buffer data adapted to the target resolution to the server 21, and the server 21 sends the frame buffer data adapted to the target resolution to the client 20, so that the target client 20 performs image display on the target interface according to the frame buffer data adapted to the target resolution.

Figure 3:
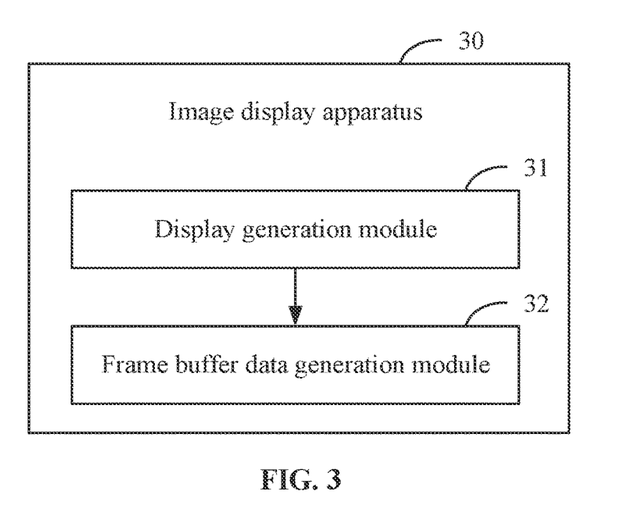
FIG. 3 is a structural schematic diagram of an image display apparatus according to an embodiment of the present disclosure.

FIG. 3 is a structural schematic diagram of an image display apparatus according to an embodiment of the present disclosure. This embodiment is applicable to the case where a client displays an image according to frame buffer data sent by a cloud device. The apparatus provided by this embodiment may be implemented by software and/or hardware and integrated in any electronic device having a computing capability.

As shown in FIG. 3, the image display apparatus 30 provided by this embodiment may include a display generation module 31 and a frame buffer data generation module 32.

The display generation module 31 is configured to generate a simulated external display of a cloud device according to an acquired target resolution of a target client.

The frame buffer data generation module 32 is configured to generate frame buffer data according to a frame buffer area of the simulated external display in the cloud device, and send the frame buffer data to the target client so that the target client performs image display on a target interface according to the frame buffer data.

Optionally, the display generation module 31 is configured to perform the operation described below.

The target resolution is compared with a current resolution of the cloud device, and the simulated external display of the cloud device is generated according to a comparison result.

Optionally, the display generation module 31 is configured to perform the operations described below.

In a case where the target resolution is different from the current resolution of the cloud device, a simulated signal inserted by a multimedia interface is generated.

The simulated external display is generated according to the simulated signal and the target resolution.

Optionally, the apparatus further includes a frame buffer area generation module configured to perform the operation described below.

A display memory application is performed in a memory of the cloud device according to the target resolution, and the frame buffer area is generated according to a display memory application result.

Optionally, the frame buffer data generation module 32 is configured to perform the operations described below.

At least one target application program associated with the target interface is determined, and layer data to be rendered and relative position information of the layer data on the target interface are acquired from the at least one target application program.

The layer data is merged according to the relative position information and the target resolution to generate merged layer data.

The merged layer data is written into the frame buffer area to generate the frame buffer data.

Optionally, the frame buffer data generation module 32 is configured to perform the operations described below.

Absolute position information of the layer data on the target interface is determined according to the relative position information and the target resolution.

The layer data is merged according to the absolute position information to generate the merged layer data.

The image display apparatus 30 provided by this embodiment of the present disclosure can perform the image display method provided by the embodiments of the present disclosure and has functional modules and beneficial effects corresponding to the performed method. For content not described in detail in this embodiment, reference may be made to the description in any method embodiment of the present disclosure.

In the technical solutions of the present disclosure, acquisition, storage and application of user personal information involved herein are in compliance with relevant laws and regulations and do not violate the public order and good customs.

According to an embodiment of the present disclosure, the present disclosure further provides an electronic device, a readable storage medium and a computer program product.

Figure 4:
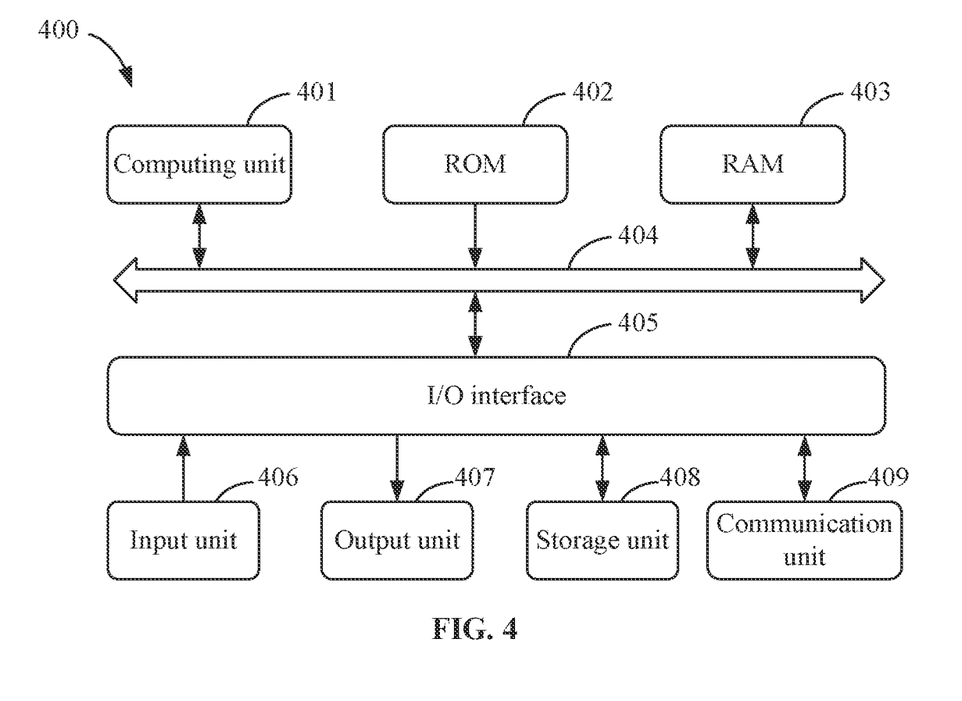
FIG. 4 is a block diagram of an electronic device for implementing an image display method according to an embodiment of the present disclosure.

FIG. 4 is a block diagram of an electronic device 400 for implementing an image display method according to an embodiment of the present disclosure. The electronic device is intended to represent various forms of digital computer, for example, a laptop computer, a desktop computer, a worktable, a personal digital assistant, a server, a blade server, a mainframe computer or another applicable computer. The electronic device may also represent various forms of mobile device, for example, a personal digital assistant, a cellphone, a smartphone, a wearable device or another similar computing device. Herein the shown components, the connections and relationships between these components, and the functions of these components are illustrative only and are not intended to limit the implementation of the present application as described and/or claimed herein.

As shown in FIG. 4, the device 400 includes a computing unit 401. The computing unit 401 may perform various types of appropriate operations and processing based on a computer program stored in a read-only memory (ROM) 402 or a computer program loaded from a storage unit 408 to a random-access memory (RAM) 403. Various programs and data required for operations of the device 400 may also be stored in the RAM 403. The computing unit 401, the ROM 402 and the RAM 403 are connected to each other via a bus 404. An input/output (I/O) interface 405 is also connected to the bus 404.

Multiple components in the device 400 are connected to the I/O interface 405. The multiple components include an input unit 406 such as a keyboard and a mouse, an output unit 407 such as various types of displays and speakers, the storage unit 408 such as a magnetic disk and an optical disk, and a communication unit 409 such as a network card, a modem and a wireless communication transceiver. The communication unit 409 allows the device 400 to exchange information/data with other devices over a computer network such as the Internet and/or various telecommunications networks.

The computing unit 401 may be various general-purpose and/or special-purpose processing components having processing and computing capabilities. Some examples of the computing unit 401 include, but are not limited to, central processing units (CPUs), graphics processing units (GPUs), various special-purpose artificial intelligence (AI) computing chips, various computing units running machine learning models and algorithms, digital signal processors (DSPs), and any suitable processors, controllers and microcontrollers. The computing unit 401 performs various methods and processing described above, such as the image display method. For example, in some embodiments, the image display method may be implemented as a computer software program tangibly contained in a machine-readable medium such as the storage unit 408. In some embodiments, part or all of a computer program may be loaded and/or installed on the device 400 via the ROM 402 and/or the communication unit 409. When the computer program is loaded to the RAM 403 and executed by the computing unit 401, one or more steps of the preceding image display method may be performed. Alternatively, in other embodiments, the computing unit 401 may be configured, in any other suitable manner (for example, by means of firmware), to perform the image display method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on a chip (SoCs), complex programmable logic devices (CPLDs), computer hardware, firmware, software and/or combinations thereof. The embodiments may include implementations in one or more computer programs. The one or more computer programs are executable, interpretable, or executable and interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device and the at least one output device.

Program codes for implementing the methods of the present disclosure may be compiled in any combination of one or more programming languages. These program codes may be provided for a processor or controller of a general-purpose computer, a special-purpose computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, the machine-readable medium may be a tangible medium that may include or store a program that is used by or used in conjunction with a system, apparatus or device that executes instructions. The machine-readable medium may be a machine-readable signal medium or a machine-readable storage medium. The machine-readable medium may include, but are not limited to, electronic, magnetic, optical, electromagnetic, infrared or semiconductor systems, apparatuses or devices or any suitable combinations thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order to provide the interaction with a user, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of devices may also be used for providing interaction with a user. For example, feedback provided for the user can be sensory feedback in any form (for example, visual feedback, auditory feedback or haptic feedback). Moreover, input from the user can be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, a server of a distributed system or a server combined with a blockchain.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations, and substitutions may be made depending on design requirements and other factors. Any modifications, equivalent substitutions, improvements and the like made within the spirit and principle of the present disclosure is within the scope of the present disclosure.

What is claimed is:

1. An image display method, comprising:
    generating a simulated external display of a cloud device according to an acquired target resolution of a target client; and
    generating frame buffer data according to a frame buffer area of the simulated external display in the cloud device, and sending the frame buffer data to the target client so that the target client performs image display on a target interface according to the frame buffer data;
    wherein the generating a simulated external display of a cloud device according to an acquired target resolution of a target client comprises:
    comparing the target resolution with a current resolution of the cloud device, and generating the simulated external display of the cloud device according to a comparison result.

2. The method according to claim 1, wherein the generating the simulated external display of the cloud device according to a comparison result comprises:
    in a case where the target resolution is different from the current resolution of the cloud device, generating a simulated signal inserted by a multimedia interface; and
    generating the simulated external display according to the simulated signal and the target resolution.

3. The method according to claim 1, further comprising:
    performing a display memory application in a memory of the cloud device according to the target resolution, and generating the frame buffer area according to a display memory application result.

4. The method according to claim 1, wherein the generating frame buffer data according to a frame buffer area of the simulated external display in the cloud device comprises:
    determining at least one target application program associated with the target interface, and acquiring layer data to be rendered and relative position information of the layer data to be rendered on the target interface from the at least one target application program;
    merging the layer data to be rendered according to the relative position information and the target resolution to generate merged layer data; and
    writing the merged layer data into the frame buffer area to generate the frame buffer data.

5. The method according to claim 4, wherein the merging the layer data to be rendered according to the relative position information and the target resolution to generate merged layer data comprises:
    determining absolute position information of the layer data to be rendered on the target interface according to the relative position information and the target resolution; and
    merging the layer data to be rendered according to the absolute position information to generate the merged layer data.

6. An image display apparatus, comprising: at least one processor; and a memory communicatively connected to the at least one processor; wherein the memory stores instructions executable by the at least one processor, and the instructions are executed by the at least one processor to cause the at least one processor to perform steps in the following modules:
    a display generation module, which is configured to generate a simulated external display of a cloud device according to an acquired target resolution of a target client; and
    a frame buffer data generation module, which is configured to generate frame buffer data according to a frame buffer area of the simulated external display in the cloud device, and send the frame buffer data to the target client so that the target client performs image display on a target interface according to the frame buffer data;
    wherein the display generation module is configured to:
    compare the target resolution with a current resolution of the cloud device, and generate the simulated external display of the cloud device according to a comparison result.

7. The apparatus according to claim 6, wherein the display generation module is further configured to:
    in a case where the target resolution is different from the current resolution of the cloud device, generate a simulated signal inserted by a multimedia interface; and
    generate the simulated external display according to the simulated signal and the target resolution.

8. The apparatus according to claim 6, further comprising a frame buffer area generation module, which is configured to:
perform a display memory application in a memory of the cloud device according to the target resolution, and generate the frame buffer area according to a display memory application result.

9. The apparatus according to claim 6, wherein the frame buffer data generation module is configured to:
determine at least one target application program associated with the target interface, and acquire layer data to be rendered and relative position information of the layer data to be rendered on the target interface from each of at least one target application program;
merge the layer data to be rendered according to the relative position information and the target resolution to generate merged layer data; and
write the merged layer data into the frame buffer area to generate the frame buffer data.

10. The apparatus according to claim 9, wherein the frame buffer data generation module is further configured to:
determine absolute position information of the layer data to be rendered on the target interface according to the relative position information and the target resolution; and
merge the layer data to be rendered according to the absolute position information to generate the merged layer data.

11. A non-transitory computer-readable storage medium storing computer instructions for causing a computer to perform the following steps:
generating a simulated external display of a cloud device according to an acquired target resolution of a target client; and
generating frame buffer data according to a frame buffer area of the simulated external display in the cloud device, and sending the frame buffer data to the target client so that the target client performs image display on a target interface according to the frame buffer data;
wherein the generating a simulated external display of a cloud device according to an acquired target resolution of a target client comprises:
comparing the target resolution with a current resolution of the cloud device, and generating the simulated external display of the cloud device according to a comparison result.

12. The storage medium according to claim 11, wherein the generating the simulated external display of the cloud device according to a comparison result comprises:
in a case where the target resolution is different from the current resolution of the cloud device, generating a simulated signal inserted by a multimedia interface; and
generating the simulated external display according to the simulated signal and the target resolution.

13. The storage medium according to claim 11, wherein the computer instructions further cause a computer to perform the following step:
performing a display memory application in a memory of the cloud device according to the target resolution, and generating the frame buffer area according to a display memory application result.

14. The storage medium according to claim 11, wherein the generating frame buffer data according to a frame buffer area of the simulated external display in the cloud device comprises:
determining at least one target application program associated with the target interface, and acquiring layer data to be rendered and relative position information of the layer data to be rendered on the target interface from the at least one target application program;
merging the layer data to be rendered according to the relative position information and the target resolution to generate merged layer data; and
writing the merged layer data into the frame buffer area to generate the frame buffer data.

15. The storage medium according to claim 14, wherein the merging the layer data to be rendered according to the relative position information and the target resolution to generate merged layer data comprises:
determining absolute position information of the layer data to be rendered on the target interface according to the relative position information and the target resolution; and
merging the layer data to be rendered according to the absolute position information to generate the merged layer data.

* * * * *